United States Patent
Richter et al.

(10) Patent No.: US 11,053,650 B2
(45) Date of Patent: Jul. 6, 2021

(54) HYDRODYNAMIC INSTALLATION HAVING AN ELECTRIC DRIVE FOR ACTUATING A WATER PROTECTION

(71) Applicant: VOITH PATENT GMBH, Heidenheim (DE)

(72) Inventors: Peter Richter, Heidenheim (DE); Andreas Lechner, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/650,445

(22) PCT Filed: Jul. 11, 2018

(86) PCT No.: PCT/EP2018/068757
§ 371 (c)(1),
(2) Date: Mar. 25, 2020

(87) PCT Pub. No.: WO2019/063156
PCT Pub. Date: Apr. 4, 2019

(65) Prior Publication Data
US 2020/0224381 A1   Jul. 16, 2020

(30) Foreign Application Priority Data
Sep. 28, 2017   (DE) .................... 10 2017 122 541.2

(51) Int. Cl.
| | |
|---|---|
| *E02B 9/02* | (2006.01) |
| *F16K 31/04* | (2006.01) |
| *F03B 13/06* | (2006.01) |
| *F16K 3/02* | (2006.01) |
| *F16K 31/50* | (2006.01) |
| *F16K 31/53* | (2006.01) |

(52) U.S. Cl.
CPC ............ *E02B 9/022* (2013.01); *F16K 31/047* (2013.01); *F03B 13/06* (2013.01); *F16K 3/0254* (2013.01); *F16K 31/508* (2013.01); *F16K 31/53* (2013.01)

(58) Field of Classification Search
CPC combination set(s) only.
See application file for complete search history.

(56) References Cited

U.S. PATENT DOCUMENTS

| | | | |
|---|---|---|---|
| 7,523,916 B2 | 4/2009 | Fenton | |
| 9,758,940 B2* | 9/2017 | Janssen | ................... E02B 9/025 |
| 2015/0330047 A1* | 11/2015 | Janssen | ..................... E02B 7/30 |
| | | | 405/92 |

FOREIGN PATENT DOCUMENTS

| | | |
|---|---|---|
| CN | 202580077 U | 12/2012 |
| CN | 103835260 A | 6/2014 |
| CN | 204225049 U | 3/2015 |

(Continued)

*Primary Examiner* — Kyle Armstrong
(74) *Attorney, Agent, or Firm* — Laurence A. Greenberg; Werner H. Stemer; Ralph E. Locher

(57) ABSTRACT

A hydrodynamic installation includes an upper water tank, a lower water tank, a water way system which has a plurality of partial water ways and which connects the upper water tank to the lower water tank. A hydraulic machine is arranged in the water way system, a water protection is arranged in a partial water way, and an electric drive provided for actuating the water protection. The electric drive is constructed in such a manner that it also ensures safe closing of the water protection in the event of a power failure without an emergency power supply being provided to this end.

9 Claims, 3 Drawing Sheets

(56) References Cited

FOREIGN PATENT DOCUMENTS

| | | |
|---|---|---|
| CN | 204475282 U | 7/2015 |
| CN | 107083759 A | 8/2017 |
| DE | 102012224188 A1 | 6/2014 |
| DE | 202013011141 U1 | 11/2014 |
| GB | 2442597 A | 4/2008 |
| JP | S58127814 A | 7/1983 |
| JP | 2000161503 A | 6/2000 |
| JP | 2011026126 A | 2/2011 |
| KR | 20020073766 A | 9/2002 |

* cited by examiner

HYDRODYNAMIC INSTALLATION HAVING AN ELECTRIC DRIVE FOR ACTUATING A WATER PROTECTION

The present invention relates to a hydrodynamic installation having an electric drive for actuating a water protection.

BACKGROUND OF THE INVENTION

Field of the Invention

For safety reasons, many hydrodynamic installations have a water protection, by means of which, in the event of damage, the installation can safely be placed out of operation. Conventionally, such a water protection is actuated by means of a hydraulic servo motor and a hydraulic unit. To this end, a large quantity of hydraulic oil which is a risk to the environment is required. There are further known from the prior art drives for water protection members of a hydrodynamic installation which are electrically actuated. Thus, DE 10 2012 224 188 A1 discloses an electric drive for actuating the water protection of a hydrodynamic installation, which comprises an electric machine and a ventilator brake. The drive further comprises two current strands: a first current strand for normal operation and a second current strand for emergency operation. The second current strand is constructed to automatically operate the electric machine during generative insulating operation. The drive is also suitable for operation in the event of a power failure without an emergency power supply being required for operation.

SUMMARY OF THE INVENTION

The problem addressed by the inventor is to provide an alternative electric drive for actuating the water protection of a hydrodynamic installation which is constructed more simply and which also safely ensures closure of the water protection in the event of a power failure without an emergency power supply or the like having to be provided to this end.

The inventor has recognized that the problem addressed can be solved by a hydrodynamic installation as claimed. Advantageous embodiments will be appreciated from the dependent claims.

The solution according to the invention is explained below with reference to Figures. The following is illustrated in detail in the drawings:

DETAILED DESCRIPTION OF THE INVENTION

Figure 1:
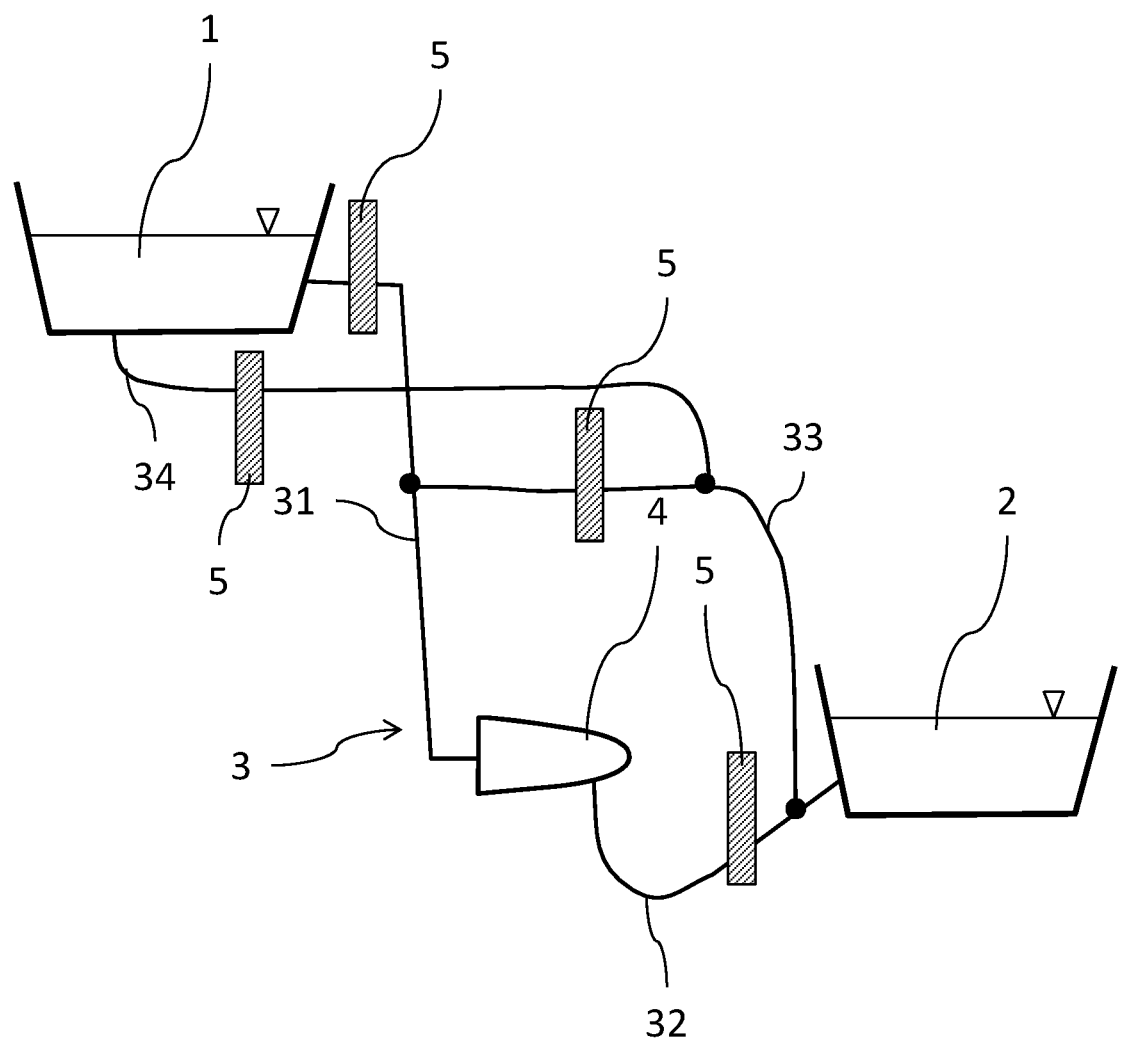
FIG. 1 shows a hydrodynamic installation.

FIG. 1 shows the schematic construction of a hydrodynamic installation. The hydrodynamic installation comprises an upper water tank which is designated 1 and a lower water tank which is designated 2, wherein the water level in the upper water tank 1 is above the water level of the lower water tank 2. The tanks 1 and 2 may also be natural bodies of water, such as, for example, lakes, rivers or arms of the sea. The hydrodynamic installation further comprises a water way system which is designated 3 and which connects the upper water tank 1 to the lower water tank 2. A hydraulic machine which is designated 4 is arranged in at least one part-water way of the water way system 3. The part-water way above the hydraulic machine 4—the pressure pipeline—is designated 31 and the part-water way under the hydraulic machine 4—the suction pipe—is designated 32. The hydraulic machine 4 may be a turbine, a pump or a pump turbine. A water protection which is designated 5 is arranged in the inlet region of the pressure pipeline 31. Generally, a water protection 5 which is arranged in the pressure pipeline 31 is used as a safety device in order to stop the hydrodynamic installation. An additional water protection is arranged in the suction pipeline 32 and is also designated 5. A water protection 5 in the suction pipeline 32 is generally used to completely place the hydraulic machine 4 in the dry state, which is necessary for maintenance work. Generally, however, the water protection 5 is also closed in the suction pipeline 32 in the event of failure in order to prevent the water from flooding back from the lower water tank 2 into the machine housing of the hydrodynamic installations, which is particularly important in power stations which are recessed deep underground in order to prevent cavitation. There are also hydrodynamic installations which have only one water protection 5 in the suction pipeline 32 which is therefore used alone to stop the hydrodynamic installation in the event of failure. A hydrodynamic installation according to the invention may have a water protection 5 in the pressure pipeline 31, in the suction pipeline 32 or in both lines.

The water protection members 5 which have been previously described and which are arranged in the pressure pipeline 31 and/or in the suction pipeline 32 are located in the open position in the normal operating state of a hydroelectric installation according to the invention. In specific hydroelectric installations, however, there are further additional water protection members 5 which are moved into the open position only in particular operating modes. Many power stations have an additional part-water way which connects the upper water tank 1 directly to the lower water tank 2. That is to say, the water in this part-water way does not flow through the hydraulic machine 4 but instead past it. Such a part-water way is illustrated in FIG. 1 and connects the pressure pipeline 31 to the suction pipe 32 and is designated 33. This bypass 33 can open equally well directly in the lower water tank 2. A water protection 5 which is closed during normal operation is arranged in the bypass 33. In many cases, this water protection 5 is flowed over or under permanently or temporarily, for example, only at high water. Such a water protection 5 is also referred to as an overflow protection ("spillway"). Occasionally, such an overflow protection 5 is also moved into the open position, for example, when the hydraulic machine 4 is being maintained. FIG. 1 shows yet another part-water way which is designated 34 and which connects the upper water tank 1 to the bypass 33. It is a so-called bottom sluice which is usually arranged in the barrage of the upper water tank and by means of which the water of the upper water tank 1 can be discharged near the base thereof. A water protection 5 which is also opened only in specific situations is also arranged in the bottom sluice, for example, in order to remove deposits from the upper water tank 1. The additional water protection members 5 described in this portion must also generally have an emergency closure function.

Figure 2:
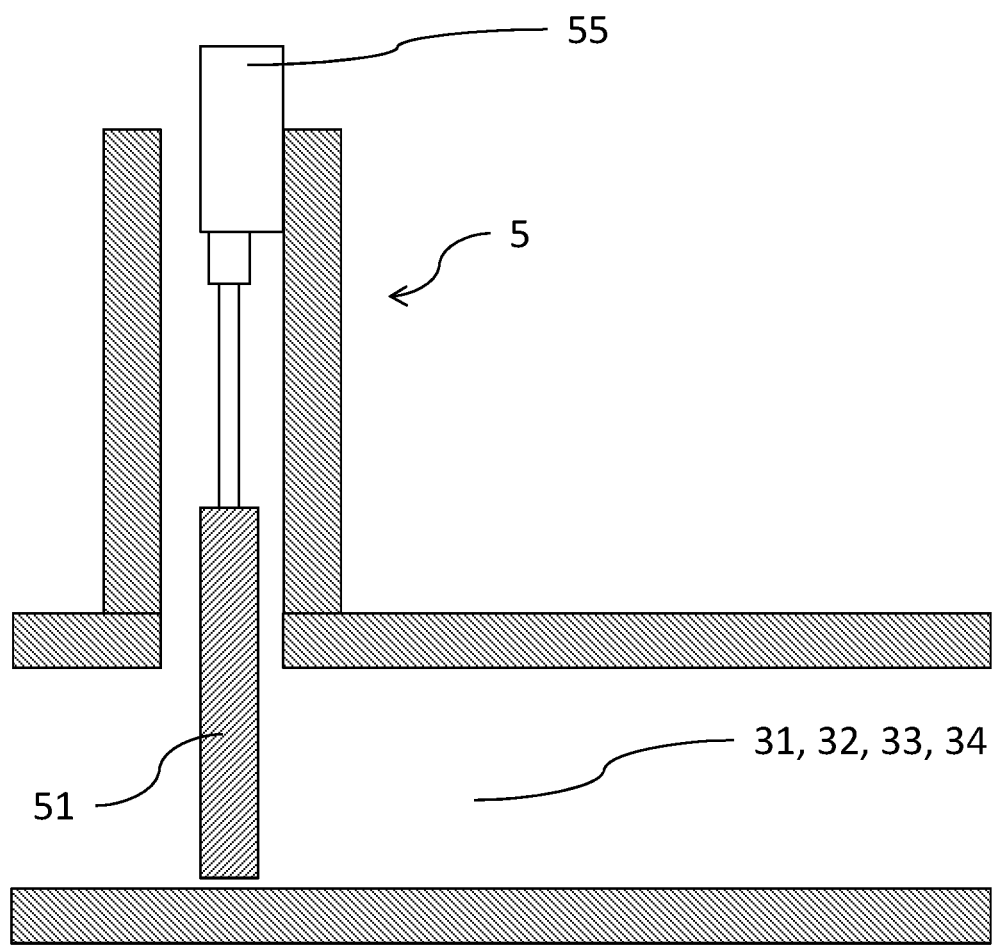
FIG. 2 shows a water protection.

FIG. 2 is a highly schematic illustration of a water protection 5 according to the invention. The water protection 5 is located in a part-water way which is designated 31, 32, 33, 34. The water protection 5 comprises a protection panel which is designated 51 and a drive which is designated 55. The protection panel 51 is movable in a vertical direction between a first position, in which the part-water way is closed, and a second position, in which the part-water way is opened. In FIG. 2, the protection panel 51 is in the first position. In order to ensure this functionality, the part-water way has suitable guide means which are not illustrated in detail in FIG. 2. The drive 55 is arranged in a vertical direction above the protection panel 51 so that it can move the protection panel 51 in a vertical direction between the positions mentioned. To this end, the water way has construction devices, to which the housing of the drive 55 is fixed. The drive 55 is connected to the protection panel 51. In principle, the drive 55 can also be arranged differently from what is shown in FIG. 2 and can be connected to the protection panel 51. Thus, the drive 55 could, for example, be orientated horizontally and could be connected to the protection panel 51 via a redirecting cable pull.

It should be noted that there are also other possible embodiments of water protection members which are compatible with the notion according to the invention, for example, so-called radial protection members, in which the protection panel is configured in a bent manner, not a planar manner, and is supported rotatably about an axis. Such radial protection members are often used for spillways. The drive 55 does not then engage directly with the protection panel, but instead with pivot arms which are connected to the protection panel. Furthermore, there are other embodiments in which, although the protection panel is configured in a planar manner, it is not movable in a purely vertical direction but instead is opened and closed in an oblique direction. In any case, the embodiments which are compatible with the notion according to the invention have in common that the protection panel 51 is configured in such a manner that it can move between a first position, in which the part-water way is closed, and a second position, in which the part-water way is open, and the water protection 5 is configured in such a manner that it can be closed simply by the action of weight force.

Figure 3:
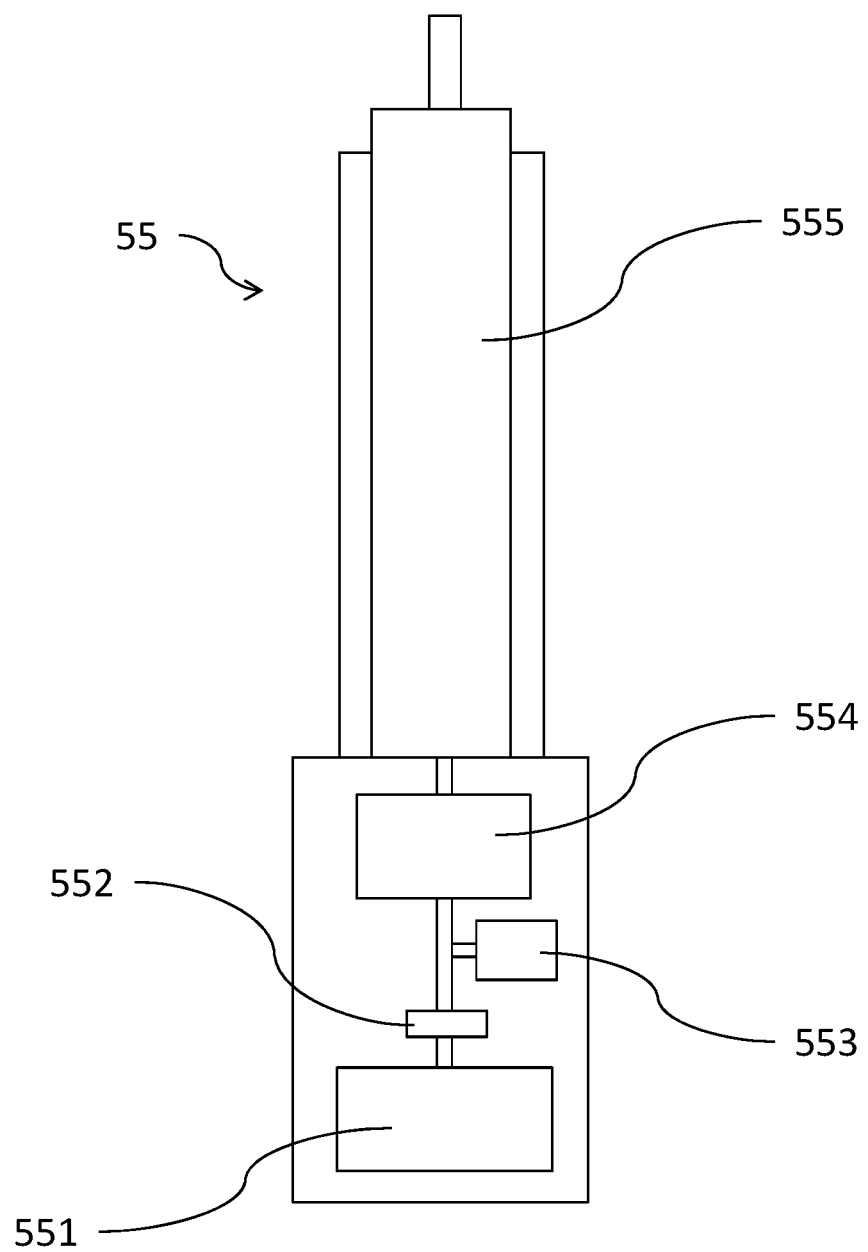
FIG. 3 shows a drive according to the invention for actuating a water protection.

FIG. 3 is a highly schematic view of a drive 55 according to the invention. The drive 55 comprises an electric motor which is designated 551, a mechanical brake which has an adjustable braking force and which is designated 552, a locking unit which is designated 553, a gear mechanism which is designated 554 and a spindle screw drive without self-locking which is designated 555. The motor 551 is connected to the gear mechanism 554 and the spindle screw drive 555 in such a manner that, by rotating the motor 551, the spindle of the spindle screw drive 555 can be extended and retracted. In the embodiment of the water protection 5 according to FIG. 2, the free end of the spindle of the spindle screw drive 555 is connected to the protection panel 51. The mentioned components are in any case configured so that the necessary force can be applied by the drive in order to move the water protection 5 into the open position. In this case, the gear mechanism 554 will operate in such a manner that the rotational movement supplied by the motor 551—relatively high speed with a relatively small torque—is converted into a rotational movement at a lower speed and higher torque and is transmitted to the spindle screw drive 555. Since the spindle screw drive 555 does not have any self-locking, it is simply necessary, in order to close the water protection 5, to switch the motor 551 into the state without current or voltage because the water protection 5 is configured in such a manner that it can be moved into the closed position by means of the weight force alone. In this case, the mechanical brake 552 with adjustable braking force is used to adjust the closing time of the water protection 5—the higher the braking force, the longer the closing time. The brake 552 is arranged so that it can inhibit the rotational movement of the drive train within the drive 55. In order to fulfill this purpose, the brake 552 can be located at various locations, for example, between the motor 551 and the gear mechanism 554, as shown in FIG. 3, or between the gear mechanism 554 and the spindle screw drive 555. It could also be integrated in the motor 551 or be located inside the gear mechanism 554. However, it is advantageous for the brake 552 to act in an inhibiting manner on a position of the train which is located at the motor side of the gear mechanism 554 because at that location smaller braking forces are sufficient to counteract the smaller torque there. The drive 55 further comprises an electrically controllable locking unit which is designated 553 and which is configured so that it can completely prevent the rotational movement of the drive train in a first state and can completely release the rotational movement in a second state, wherein the first state is taken up when the locking unit 553 receives an electrical signal and the second state is taken up when no electrical signal is present. With respect to the position of the locking unit 553, what has been set out with regard to the brake 552 applies similarly. There are many possible embodiments which are suitable for the locking unit 553. Thus, an embodiment may involve, for example, a controllable brake, the braking force of which in the closed first state is so great that the weight force of the protection panel 51 is insufficient to overcome the static friction of the brake. It could involve, for example, a catch construction which engages in a corresponding toothed wheel (for example, in the gear mechanism) in order to completely prevent the rotational movement of the drive train. Or it could involve a device having a retractable and extensible pin which engages in a corresponding opening, for example, in the drive shaft of the train, as indicated in FIG. 3, or in a wheel of the gear mechanism 554. In this case, the described operation of the control of the locking unit 553 can be achieved, for example, by the cooperation of electromagnets, permanent magnets and/or mechanical springs. The purpose of the locking unit 553 involves the drive 55 being able to be blocked in the open state of the water protection 5 so that the motor 551 can be switched off. Since the water protection 5 is in this state for most of the time, energy can be saved since the locking unit 553 in the blocked first state consumes only a small amount of energy. On the other hand, it is ensured by the switching logic described that, in the event of a power failure, the locking unit 553 takes up the second state and thereby releases the drive train so that the water protection 5 can close with the closing time adjusted via the brake 552. The drive of the present invention allows the protection panel 51 to be locked in virtually any position thereof. Thus, for example, the water protection 5 can also be blocked in the closed state, which increases, for example, the safety during maintenance work.

When the water protection 5 is opened, the time for opening is controlled by the speed of the motor 551. In this case, the motor 551 will generally run at a constant speed. If the brake 552 engages in the drive train in a permanently inhibiting manner, the motor 551 operates in this case counter to the braking force. Optionally, the energy consumption during opening may be reduced by the brake 552 being able to be deactivated in an electrically controlled manner, that is to say, in a first state, the brake 552 acts with the preset braking force in the drive train in an inhibiting manner and, in a second state, the brake 552 completely releases the drive train.

In this case, the brake 552 is configured so that the second state is taken up when an electrical control signal is applied and the first state is taken up when no electrical control signal is applied. It is thereby ensured that it is also reliably possible to close the water protection 5 with the adjusted closing time in the event of a power failure. Alternatively, the brake 552 may also be configured in such a manner that it engages in the drive train only in one rotation direction of the drive train in an inhibiting manner. That is to say, only if the drive train rotates in the closure direction (wherein the protection panel 51 is lowered) does the brake 552 engage in the drive train in an inhibiting manner, and, in the opening direction (wherein the protection panel 51 is raised), the drive train can rotate in an uninhibited manner.

Closing the water protection 5 can be brought about in two manners. Either by switching the motor 551 into the currentless state with an active brake 552, or by retracting the spindle thread drive by means of the motor 551. In both cases, naturally the locking unit 553 has to release the drive train. In the second case, the closing time is controlled via the speed of the motor 551 and the brake 552 may where applicable be deactivated in order to save energy.

It is clear from what has been set out that the brake 552 can always be deactivated when the motor 551 operates, that is to say, is electrically energized. Therefore, it is particularly advantageous for an optionally controllable brake 552 to be integrated in the motor 551 because the control of the brake 552 can be carried out via the electrical power supply of the motor 551. Thus, fewer components are required and the construction of the drive is further simplified.

Ball screws or planetary roller screw drives can be used for the spindle screw drive 555 because they do not have any self-locking action.

It should further be mentioned that the arrangement of the individual components in FIG. 3 is intended to be understood only by way of example. For example, by using suitable cone gear wheels or the like, the drive train can be redirected and thus the length of the drive 55 can be configured in a shortened manner. However, the following sequence in the drive train is always provided: motor 551, gear mechanism 554, spindle screw drive 555.

The invention claimed is:

1. A hydrodynamic installation
   an upper water tank, a lower water tank, and a water way system which connects said upper water tank to said lower water tank and which includes a plurality of part-water ways;
   a hydraulic machine arranged in said water way system;
   a water protection arranged in a part-water way, said water protection including a movable protection panel mounted for movement between a first position, in which the part-water way is closed, and a second position, in which the part-water way is open;
   an electrically controllable locking unit for locking said protection panel and an electric drive having a drive train with an electric motor and a gear mechanism;
   said water protection being configured for movement into the closed position simply by a weight force, and said electric drive being configured for moving said water protection into the open position and the closed position;
   said drive train further including a spindle screw drive with a spindle, wherein the components of the drive train are arranged in the sequence mentioned so that, by operating said electric motor, said spindle is selectively retracted and extended in order to move said water protection into the open position and the closed position;
   wherein said locking unit is integrated in said electric drive and is constructed to block said drive train if an electrical control signal is applied, and to release said drive train if no electrical control signal is applied; and
   said electric drive further including a mechanical brake having an adjustable braking force and being configured to engage in said drive train in an inhibiting manner in order to adjust a closing time of said water protection, wherein said mechanical brake can act in an inhibiting manner on a position of said drive train located at a motor side of said gear mechanism.

2. The hydrodynamic installation according to claim 1, wherein said brake is arranged to engage at a position of said drive train at which relatively small torques act.

3. The hydrodynamic installation according to claim 1, wherein said locking unit is arranged to engage at a position of said drive train at which relatively small torques act.

4. The hydrodynamic installation according to claim 1, wherein said brake is configured to be electrically controlled so that the brake can engage in the drive train in an inhibiting manner in a first state with a preset braking force and, in a second state, can completely release said drive train, wherein the second state is taken up when an electrical control signal is applied and the first state is taken up when no electrical control signal is applied.

5. The hydrodynamic installation according to claim 1, wherein said brake is configured to engage in said drive train in an inhibiting manner only in a rotation direction of said drive train in which said water protection is closed, and, in an opposite rotation direction, the drive train can rotate without being uninhibited by said brake.

6. The hydrodynamic installation according to claim 1, wherein said brake is integrated in said motor.

7. The hydrodynamic installation according to claim 1, wherein said locking unit is integrated in said gear mechanism.

8. The hydrodynamic installation according to claim 1, wherein said spindle screw drive is a ball screw.

9. The hydrodynamic installation according to claim 1, wherein said spindle screw drive is a planetary roller screw drive.

* * * * *